US007752652B2

(12) United States Patent
Prokupets et al.

(10) Patent No.: US 7,752,652 B2
(45) Date of Patent: *Jul. 6, 2010

(54) SYSTEM FOR INTEGRATING SECURITY AND ACCESS FOR FACILITIES AND INFORMATION SYSTEMS

(75) Inventors: Rudy Prokupets, Rochester, NY (US); Michael Regelski, Rochester, NY (US)

(73) Assignee: Lenel Systems International, Inc., Pittsford, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/983,322

(22) Filed: Nov. 8, 2007

(65) Prior Publication Data

US 2008/0083018 A1 Apr. 3, 2008

Related U.S. Application Data

(63) Continuation of application No. 09/906,554, filed on Jul. 16, 2001, now Pat. No. 7,380,279.

(51) Int. Cl.
*G06F 7/04* (2006.01)
(52) U.S. Cl. ............................................. 726/2; 726/21
(58) Field of Classification Search ........................ None
See application file for complete search history.

(56) References Cited

U.S. PATENT DOCUMENTS 4,218,690 A 8/1980 Ulch et al.
4,839,640 A 6/1989 Ozer et al.

(Continued)

OTHER PUBLICATIONS

Asset ID Programming Specification, Version 1.1, published by IBM Personal Systems Group, Feb. 5, 1999.

(Continued)

*Primary Examiner*—Kambiz Zand
*Assistant Examiner*—Peter Poltorak
(74) *Attorney, Agent, or Firm*—Kenneth J. Lukacher

(57) ABSTRACT

A system for integrating security and access for facilities and information systems is provided including a computer server, information systems, and facility protection systems. The information systems and facility protection systems are coupled for communication to the computer server via a network. Facility protection systems represent an access control system for controlling entry/exit to areas of buildings, such as with badges or other ID Credentials and other systems, such as intrusion detection and fire systems, to provide protection in facility environments. Information systems each represent a computer system requiring user authorization, via computers or terminals capable of connecting thereto, to access information resources or network environments protected by the computer system. Information systems may also include information protection systems requiring user authorization for external access to other information systems. The computer server has a central database which stores at least information defining users and their access privileges to the information systems and to areas of facilities controlled by access control system. Each of the information systems and facility protection systems sends event data to the computer server when an event occurs on its respective system, and an event transaction processor in the computer server determines action(s), if any, to take in response to one or more received events and accordingly sends action data to other information systems and facility protection systems to instruct such systems to automatically respond to security risks representing by such events in real-time. Central management of users and their access privileges, and monitoring of events is further provided.

16 Claims, 11 Drawing Sheets

U.S. PATENT DOCUMENTS

| | | | |
|---|---|---|---|
| 4,962,473 A * | 10/1990 | Crain | 340/541 |
| 5,111,185 A | 5/1992 | Kozaki | |
| 5,483,596 A | 1/1996 | Rosenow et al. | |
| 5,574,786 A | 11/1996 | Dayan et al. | |
| 5,629,981 A * | 5/1997 | Nerlikar | 713/168 |
| 5,630,058 A | 5/1997 | Mosley et al. | |
| 5,646,605 A * | 7/1997 | Leonaggeo et al. | 340/5.64 |
| 5,712,973 A | 1/1998 | Dayan et al. | |
| 5,887,140 A | 3/1999 | Itsumi et al. | |
| 5,892,901 A | 4/1999 | Landwehr et al. | |
| 5,912,621 A | 6/1999 | Schmidt | |
| 5,949,882 A | 9/1999 | Angelo | |
| 5,960,085 A | 9/1999 | De La Huerga | |
| 5,970,227 A | 10/1999 | Dayan et al. | |
| 6,035,406 A | 3/2000 | Moussa et al. | |
| 6,233,588 B1 | 5/2001 | Marchoili et al. | |
| 6,286,102 B1 * | 9/2001 | Cromer et al. | 726/35 |
| 6,542,075 B2 | 4/2003 | Barker et al. | |
| 6,738,772 B2 | 5/2004 | Regelski et al. | |
| 6,747,564 B1 * | 6/2004 | Mimura et al. | 340/825.6 |
| 2002/0052719 A1 | 5/2002 | Alexander et al. | |
| 2002/0143934 A1 | 10/2002 | Barker et al. | |
| 2003/0005326 A1 * | 1/2003 | Flemming | 713/201 |
| 2005/0021309 A1 | 1/2005 | Alexander et al. | |

OTHER PUBLICATIONS

Asset ID RF Signal and Protocol Specification, Version 1.0, published by Atmel Corporation, HID Corporation, and IBM Corporation, Nov. 3, 1998.

Asset ID Compliance Overview, published by IBM Personal Systems Group, Nov. 3, 1998.

Lenel OnGuard Technical Functional Generic Specification, published by Lenel Systems International, Inc., Jun. 2000.

Lenel OnGuard Technical Functional Generic Specification, Published by Lenel Systens international, Inc., Sep. 2001.

Lenel OnGuard Video Corporate Brochure, published by Lenel Systems International, Inc., Jun. 2001.

* cited by examiner

ACS = Access Control System
IS = Information System
IDS = Intrusion Detection System ACS = Access Control System
IS = Information System IS = Information System
HR = Human Resources ACS = Access Control System
IS = Information System

SYSTEM FOR INTEGRATING SECURITY AND ACCESS FOR FACILITIES AND INFORMATION SYSTEMS

This application is a continuation of U.S. patent application Ser. No. 09/906,554, filed Jul. 16, 2001 now U.S. Pat. No. 7,380,279.

FIELD OF THE INVENTION

The present invention relates to a system (and method) for integrating security and access to facilities and information systems, and relates particularly to a system for integrating security in the facilities physical environment provided by facility protection systems with security access to data and network environments provided by information systems. Facility protection systems may represent an access control system for controlling entry/exit to areas of buildings, fire system, and intrusion detection system, or other physical environment protection systems, such as digital video recording and surveillance system, building automation system, or personal alarm safety system. Information systems each represent a computer system, requiring user authorization via computers, terminals or other computer-based devices, in communication thereto, to access the information resources and network environments protected by the computer system. Information systems may also include information protection systems requiring user authorization for external access to other information systems. The invention is useful for enabling events occurring at a facility protection system or information system that may pose a security risk to automatically cause actions, in accordance with such events, in other facility protection systems or information systems, such that the security risk may be responded to automatically and in real-time in both the facilities physical environment, and the data and network environments protected by information systems. In addition, the invention is useful for central management of users and their access privileges and integrated monitoring of events at facility protection systems and information systems.

BACKGROUND OF THE INVENTION

Conventionally, electronic access control to areas of buildings involve access controllers coupled to readers and similar devices which control locking mechanisms to doors accessing areas of buildings. Access decisions, responsive to a badge or other user identifying means read by such readers, are based on information stored in a central computer database or in local databases of the access controllers. Such facilities access control systems are described for example in U.S. Pat. Nos. 4,839,640 and 4,218,690, and also the ONGUARD® systems sold by Lenel Systems International, Inc., Rochester, N.Y. Events detected by access control systems indicating that security has been compromised can be monitored by security personnel, but are not capable of automatically affecting user access in information systems, such as Windows NT, Windows 2000 or Unix servers, which often have terminals or computers located in the same physical environment controlled by the facility's access control systems. Typically, access to information is provided by user authorization, such as Login ID and associated password maintained by a system administrator. As a result, a user whose access privileges to areas of a building have been discontinued, often continues to have access to sensitive data maintained on information systems for a period of time, i.e., until a system administrator for the information systems is notified and then updates the user's access to the information systems, such as by disabling their Login IDs and passwords.

Similarly, at an information system, a user whose access, such as by Login ID and password, may have been blocked, can often continue to having access to areas of a building for a period of time, i.e., until an administrator of the facility's access control system is notified and then changes the user's privileges to access such areas. The delay between the blocking of access to an information system or facilities access control system after a security breach is detected may be minutes, hours or days, depending on the responsiveness of personnel and effectiveness of company policy and procedures. Such a delay can be detrimental to the ability of a company, government organization, or other institution, to protect sensitive information. Further, often other types of facility protection systems are provided in the same environment as the access control system, including digital video surveillance, fire and intrusion detection (burglar) systems, which may detect events posing risk to a facility, personnel, and information systems. Such events, although reported to security personnel monitoring facility protection systems, do not necessarily cause any automatic actions to protect data maintained by the information system, or in the case of intrusion detection (break-in), limit door exits by the access control system in the area of the detected intrusion.

Accordingly, it would be desirable to provide integrated monitoring and real-time response to events occurring in facilities physical environment protected by facility protection systems (such as access control systems, fire and intrusion detection systems) and data and network environments of information systems, respectively, such that events occurring in facility protection systems can cause actions at information systems to protect access to data and networks, and events occurring at information systems can cause actions at facility systems to protect facilities controlled/monitored by such facility protection systems. Furthermore, it would also be desirable to integrate the management of users and their access privileges to the facility environment controlled by a facility's access control system with user and access privileges to the data and network environments controlled by information systems.

Complex login procedures have been developed for information systems to increase secure access to such systems, such as described, for example, in U.S. Pat. Nos. 6,035,405, 5,887,140, 5,892,901, 5,970,227, and 5,712,973. Such login procedures have involved the use of other login means, such as biometric, fingerprint, smart cards, security tokens or badge ID information, often with authorization circuitry coupled to terminals of information systems enabling reading of such information. However, such information systems do not link access to information systems with access to facilities, in which the management of users and access privileges to facilities and information system are integrated in a single system.

SUMMARY OF THE INVENTION

Accordingly, the principal object of the present invention is to provide a system and method for integrating security and access to facilities and information systems.

An object of the present invention is to provide a system for integrating security and access to facilities and information systems in which events detected by facility protection systems can automatically cause actions at information systems, and vice versa, in real-time.

Another object of the present invention is to provide a system and method for integrating security and access to facilities controlled or monitored by facility protection systems with security and access to information systems by linking such systems using a computer server capable of responding to events at such systems and integrating management or user and access privileges to such systems.

A further object of the present invention is to provide a system for integrating security and access for facilities and information systems that provides integrated, centralized monitoring for events generated by facility protection systems and information systems.

Briefly described, the present invention embodies a system including a computer server system, referred to herein as the security server, facility protection systems and information systems, where the facility protection systems and information systems are coupled to the security server by a data communication network. Facility protection systems represent an access control system for controlling entry/exit to areas of buildings, and one or more other systems, such as fire system, intrusion detection (burglar) system, and digital video recording system. Information systems each represent a computer system, such as a computer server (e.g., Windows NT, or Unix servers) requiring user authorization via computers, terminals or other computer-based devices capable of communication to the computer system, to access the information resources (e.g., databases) and network environments protected by the computer system. Information systems may also include external access protection system (e.g. firewall or Virtual Private Network) requiring user authorization to enable external access to other information systems that protect information resources and network environments, such as described above. User authorization may refer to any authorization means, such as smart cards, biometrics (e.g. face, retina, or fingerprint recognition), security tokens and PIN, or Login ID and password, to access the data and network environments maintained by information systems. The security server has a central database that stores at least information defining users (user data), their access privileges to entry/exit to areas of buildings by the access control system, and their access privileges to the information systems. The central database may also store information defining the users' access privileges for masking of zones monitored by the intrusion detection system. Each of the information systems and facility protection systems sends event data packets to the security server when an event occurs on their respective system with information about the event. The security server stores received events chronologically in an event log in the central database, and an event transaction processor in the security server determines the action(s), if any, to take in response to the received event data packets. When an event from one of the facility protection systems is received and action is required, action data packets are sent by the security server to information systems and/or one or more other facility protection systems instructing them to take an action in accordance with the event. Similarly, when an event from an information system is received and action is required, an action data packet is sent by the security server to one or more facility protection systems, or other information systems, instructing them to take an action in accordance with the event. The security server formats each action data packet to include a command in accordance with the instruction set of respective system to receive the action data packet. Each of the information systems and facility protection systems may have an interface (hardware and software) which directs their respective system to respond to commands of received action data packets, thereby instructing such systems to automatically respond in real-time to events received by the security server. The interface further collects events occurring at their respective system and formats such events in one or more event data packets for transmission to the security server and storage in the event log in the central database.

The security server provides for download of user data, including security information (e.g., access privilege information), from the central database to the access control system, when such user data affecting security is changed (added, deleted, or revised) in the central database. The security server further updates access privileges to information systems when user data affecting security is changed (added, deleted, or revised) in the central database. Such changes may be made as a result of changes in an external database or repository such as maintained by a human resources (HR) department of an organization, in which changes in the external database are mapped by the security server to records of tables stored in the central database for such user data. Based on such user data received from the external database, the security server determines the access privileges for facility protection systems which control access (the access control system access—entry/exit to areas of buildings, and/or the intrusion detection system—masking of monitored zones), and access privileges for information systems. The central database may be reviewed and changed by one or more administration computer systems (clients) in data communication with the security server, via the network or other network or connection, such as to integrate management of users and their ID Credentials (such as badges, smart cards, tokens, biometric information, login ID, or passwords) needed to access protected facilities and information systems. Events, especially events representing alarms (potential security risks), received by the security server are provided to one or more alarm monitoring systems (clients) in data communication with the security server, via the network or other network or connection, thereby integrating monitoring of events at facility protection systems and information systems.

Although facility protection systems are described as access control, fire, intrusion detection, and digital video recording systems, they may include other types of systems, such as a building automation system, intercom system, personal safety alarm systems, or asset tracking and management systems, or other systems typically used for protection and management of personnel and property in facilities environments.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF INVENTION

Figure 1:
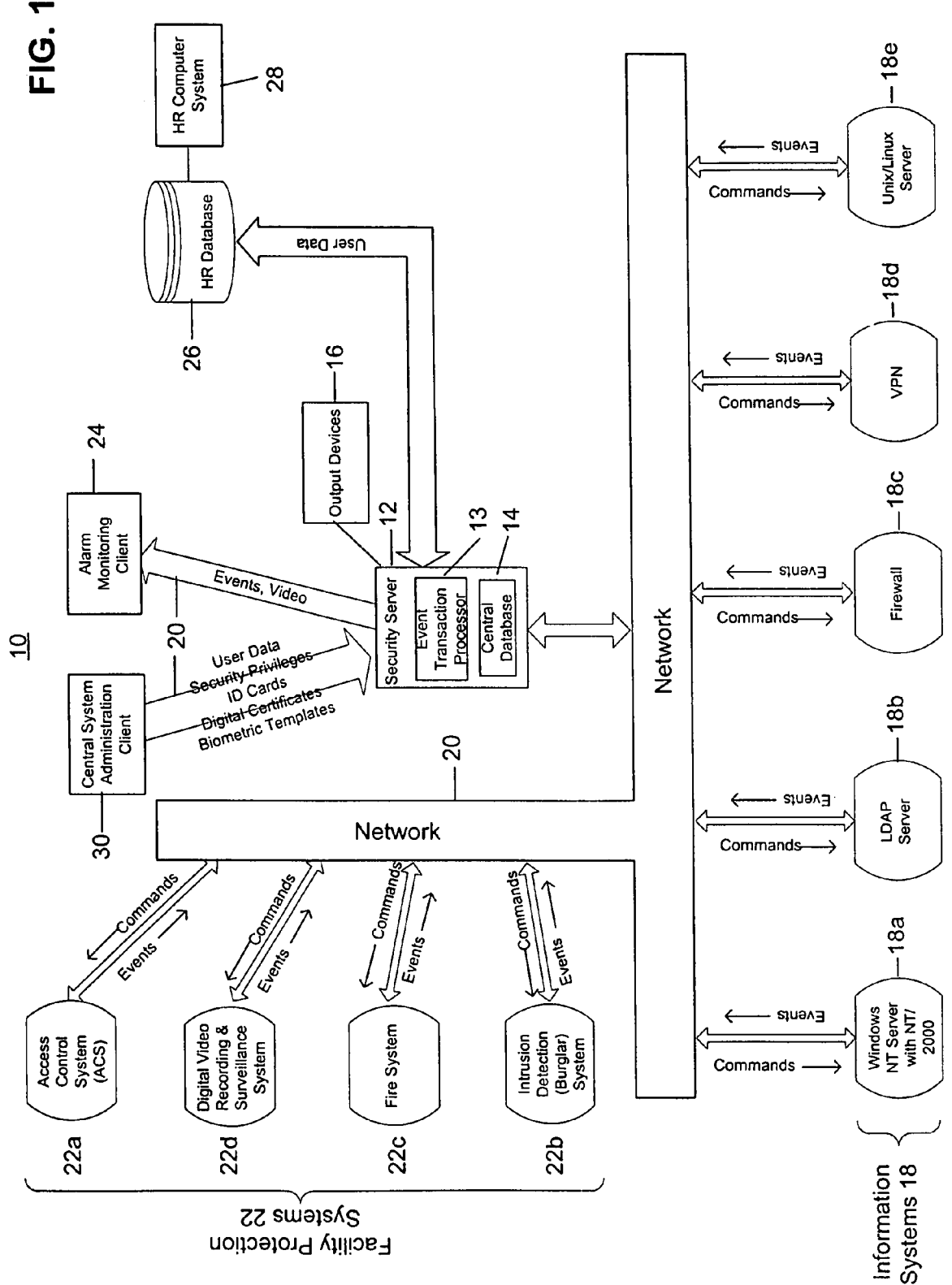
FIG. 1 is a block diagram of the system according to the present invention showing a computer server (security server) coupled by a network to facility protection systems and information systems.

Referring to FIG. 1, a system 10 is shown having a computer server system referred to herein as the security server 12, with memory storing a central database 14. The security server 12 represents a network capable computer system, and memory storing central database 14 may be a hard disk drive, or a separate memory storage unit coupled to the security server 12. The security server 12 is connected to facility protection systems 22 and information systems 18, via a network 20, in which systems 18 and 22, and security server 12, each have an interface (hardware and software) enabling network communication. Network 20 represents any typical computer network, such as LAN, WAN, or Internet, in which each component in the network has an IP address. Data may be sent through the network 20 in packets, or files, to components by their IP address, as typical of network communication protocol. Although less preferred, one or more components in system 10 may be serially connected to communication ports on security server 12 in which a typical serial communication protocol is used. As will be described, security server 12 receives event data from systems 18 and 22, logs them in the central database 14, routes events to alarm monitoring clients and to the event transaction processor and then, depending on the event data, outputs action data packets (requests) to such systems 18 and 22, different from the system from which the event data is received, to take specific actions automatically and in real-time. The security server 12 may send in response to event data, messages to one or more output devices 16, such as automated calls to pagers, telephones, or e-mail, or other communication systems. Output devices 16 include the appropriate interfaces to such communication systems for such systems to operate in accordance with phone numbers or e-mail addresses.

Facility protection systems 22 include an access control system (ACS) 22a, intrusion detection or burglar system (IDS) 22b, fire system 22c, and digital video recording and surveillance systems 22d. The access control system 22a is described in U.S. patent application Ser. No. 09/135,822, filed Aug. 18, 1998, which is incorporated herein by reference, and assigned to the same assignee as the present application. The computer server described in this patent application may provide security server 12 with central database 14, and is further programmed as described herein to provide an integrated security system 10 for facility protection systems 22 and information systems 18. In brief, the access control system 22a includes one or more access controllers in which each access controller is coupled to one or more card readers. Each access controller may be separately connected to network 20 for communication with security server 12. The card readers read data from badges and any pin number data entered at a keypad of the reader. The access controllers each make access decisions responsive to data from the card reader for controlling locking mechanisms to doors accessing areas of buildings. For example, the access control system 22a may be the ONGUARD® system sold by Lenel Systems International, Inc. of Rochester, N.Y. However, other types of access control systems may also be used capable of communication with security server 12.

Intrusion detection system 22b represents a system for detecting break-ins in a facility, such as with sensors detecting motion, window/glass breakage, and the like. The intrusion detection system 22b operates such sensors in multiple zones of a facility, as typical of intrusion detection systems. One or more IDS panels and alarm keypads are present in the facility capable of controlling operation of the system 22b in specific or multiple zones. The panels each have an interface coupling the panel to the security server 12 via network 20, or a single interface may be provided to all or groups of panels. With the proper code entered on the alarm keypad one or more zones may be masked to avoid sensor(s) in such zones from triggering an alarm event in system 22b. These codes may be an ID associated with the user in system 10. For example, intrusion detection system 22b may be a system such as manufactured by Digital Monitoring Products, Inc. of Springfield, Mo.

Fire system 22c represents a life safety system providing fire detection used in facilities, such as with sensors for detecting smoke or heat, and the like. The systems may incorporate visual or audio alert, and control sprinklers, if present in a facility. Such systems have fire panels in the facility capable of controlling operation of system 22c. The panels each have an interface coupling the panel to the security server 12 via network 20, or a single interface may be provided to all or groups of panels. For example, fire system 22c may be a system such as manufactured by Pyrotronics, Inc. of Cedar Knolls, N.Y.

Digital video recording and surveillance system 22d represents surveillance system of digital video cameras connected to video servers or IP based digital video cameras located in areas of facilities. Each such IP camera may have a network interface to connect directly to network 20. These cameras are capable of detecting motion within their viewing area by detecting changes between two bitmap images or video frames successively taken by the camera. The cameras may be activated in response to signals (commands) from security server 12 to take still pictures or full motion video of a scene to record it to video server, or download images or video directly to the security server 12 for monitoring and storage in central database 14.

Facility protection systems 22 may include other systems, such as an intercom system, personal safety alarm systems, physical asset management systems, building automation system, or other systems typically used for protection and management of personnel and property in facility environments. The intercom system utilizes intercoms at doors in a facility, such as, for example, the Alphacom system manufactured by Stentofon, Inc. Personal safety alarm systems represent handheld or worn portable transmitters that can transmit an alarm signal when activated by a user indicating the location, transmitter, user name or other identifier, and the time and date. Personal safety alarm systems are manufactured, for example, by Viasonic, Inc. Physical asset management systems provide for tracking and recording asset movement in a facility. Such systems use active or passive RF tags on assets, such as business equipment, which may be read by sensors in a facility to indicate location and movement of assets. Asset management systems, for example, may track passive RF tags, such as used in the Proxtrack System manufactured by HID, Inc. and IBM, Inc., as described in Asset ID Programming Specification, Version 1.1, published by IBM Personal Systems Group, Feb. 5, 1999, and Asset ID RF Signal and Protocol Specification, Version 1.0, published by Atmel Corporation, HID Corporation, and IBM Corporation, Nov. 3, 1998. Active RF tags are manufactured by Automatic Identification Technology. Building automation systems are systems providing control of heating, temperature, air conditioning, lighting, or energy flow in a facility, such as manufactured by Honeywell, Inc., Johnson Controls, Inc., or Automatic Logic, Inc. The digital video management and surveillance system 22*d* and asset management system may be part of the OnGuard® System, as described in Lenel OnGuard Technical Functional Generic Specification, published by Lenel, Inc., June 2000.

Each facility protection system's interface is capable of data communication with the security server 12 over the network 20, such that events occurring at such system are sent to the server for processing. These interfaces and their communication protocol are set forth by the manufacturer of their system to enable compatible communication with security server 12. For example, typically the Bac Net or Echelon Protocol is used for interfacing with building automation systems. Certain components of the facility protection systems 22 may also be able to take actions in response to commands from the security server 12, such as the assess control system 22*a*, intrusion detection system 22*b*, fire system 22*c*, and digital video recording and surveillance system 22*d*, as will be described later in more detail.

The information systems 18 represents typical data network systems, such as Windows NT Server 18*a*, Lightweight Directory Access Protocol (LDAP) Server 18*b*, or Unix/Linux Server 18*e*, and information protection systems, such as firewall system 18*c* or Virtual Private Network (VPN) system 18*d*. Servers 18*a*, 18*b*, 18*d* and 18*e* may be located in areas of buildings controlled by the access control system 22*a*, or monitored by other facility protection systems 22, and are coupled to terminals, personal computers, or work stations, which also may be in other areas of such buildings. Firewall system 18*c* is an information system enabling outside (external) access, such as dial in through a Public Switched Telephone Network (PSTN), to users from external computers to access information resources, such as other information systems 18, located on network 20. Each information system 18 provides user authorization through Login ID and associated passwords, security token and PIN, or smart card and digital certificates, to enable access by users through a login screen. Other user authorization means may also be used, such as biometric fingerprint, voice and face data. One or more of the information systems 18 may be present in system 10. Information systems 18 are not limited to those shown in FIG. 1, and any type of computer or network-based information system could be used which requires user authorization to access to network and data resources, and is capable of communication with security server 12, such as non-LDAP directory servers, network switches, network routers, SNMP controllable devices, PKI Systems, or digital certificate authorities. Network operating systems other than Windows NT Server 18*a* or Unix/Linux Server may also be represented by information systems 18, such as Windows 2000 Server. Other systems than firewall 18*c* and VPN 18*d* systems may also be used to provide external access protection before allowing access to a user authorization screen (e.g., login screen) for another information system, such as servers 18*a* or 18*e*.

Each of the information systems' interfaces, like that of the facility protection systems, is capable of receiving and sending data packets (records or files) to and from security server 12 via network 20. Each interface of systems 18 and 22 receives action data packets directed to the assigned IP address of systems 18 and 22, or a component thereof. The interface interprets and formats the commands and data of each action data packet for controller(s) in the system receiving the action data packet. Each controller in systems 18 and 22 operates in response to the interpreted commands to effect an action. For example, action data packets may be directed to one of information systems 18, access control system 22*a*, or intrusion detection system 22*b* to cause changes in users' security access to their respective system. For information systems 18, the controller coupled to the interface may be composed of software modules that control user authorization, e.g., user login and password, access control list, security policies or accounts, or resources definitions. For access control system 22*a*, the interface represents a software access control driver coupled to one or more hardware access controllers, as described in the earlier incorporated patent application, in which such controllers make access control decisions.

The commands used by the security server 12 in action data packets depend on the Application Programming Interface (API) or interface protocol, for the particular one of systems 18 or 22, or component thereof, to which such action data packet is being sent, as defined by the manufacturer of the system in reference manuals for their interface. For example, one or more of the information systems 18, such as Windows NT Server 18*a*, have a defined API, as described in Microsoft Win32 API Programmers Reference, published by Microsoft, Inc. For example, access control system 22*a* interface may be in accordance with Lenel OpenDevice API, published by Lenel Systems International, Inc. Interfacing with intrusion detection system 22*b* may be described, for example, in the D6600 Communications Receiver/Gateway Computer Interface Manual, which is published by Radionics, Inc., and which utilizes the "SIA Format" Protocol Digital Communications Standard for Alarm System Communications, published by the Security Industry Association. Interfacing with fire system 22*c* may be described for example in Cereberus Pryontronics Programmers Reference Manual, published by Cereberus Pyrotronics, Inc.

The security server 12 has software for mapping actions to be taken into commands in communication protocol for the interface for each facility protection system 22 and information system 18, such that the interface can interpret the command and data content, or fields, in an action data packet for it's respective controller(s). To facilitate this, the security server 12 may employ an agent software program that provides such mapping of a set of functions (actions) to the instruction set of a particular component in systems 18 and 22.

Each interface of the information systems 18 and facility protection systems 22 is programmed to also collect events occurring at its respective system. Such events may be sent from the controller(s) of access control system 22*a* and information systems 18 into memory allocated in such systems for storage of events. The interface sends data representing one or more collected events in one or more event data packets to the security server 12. The event data packets include a unique System ID, so that from data packets sent to the security server 12, the originator (sender) of the event data packet can be identified. Each addressable part, i.e., controller, interface, or device, of the information systems 18 and facility protection systems 22 may have a unique System ID in system 10. The System ID may be a single identifier or composed of several identifiers that indicate levels of subcomponents in a system.

For information systems 18, typical events would be the logon of a user (an authorization event), logoff of a user, failed user attempt to logon, or change in user password or access privilege of the user. For access control system 22a, typical events would be a user entry or exit through a door, unauthorized attempt to enter, or forced entry. For the intrusion detection system 22b, typical events would be the detection of an intrusion in a zone, and for a fire system 22c, a typical event would be the detection of smoke or fire is a zone or area. For digital video recording and surveillance system 22d, a typical event would be the detection of motion within the viewing area of a specific camera. Certain events at information systems 18 and facility protection systems 22 indicating a security risk condition represent alarms at such system, and in integrated system 10 generally. Each of the systems 18 and 22 internally is programmed to react to events, while also sending event data packets to the security server 12 describing the events.

Figure 2:
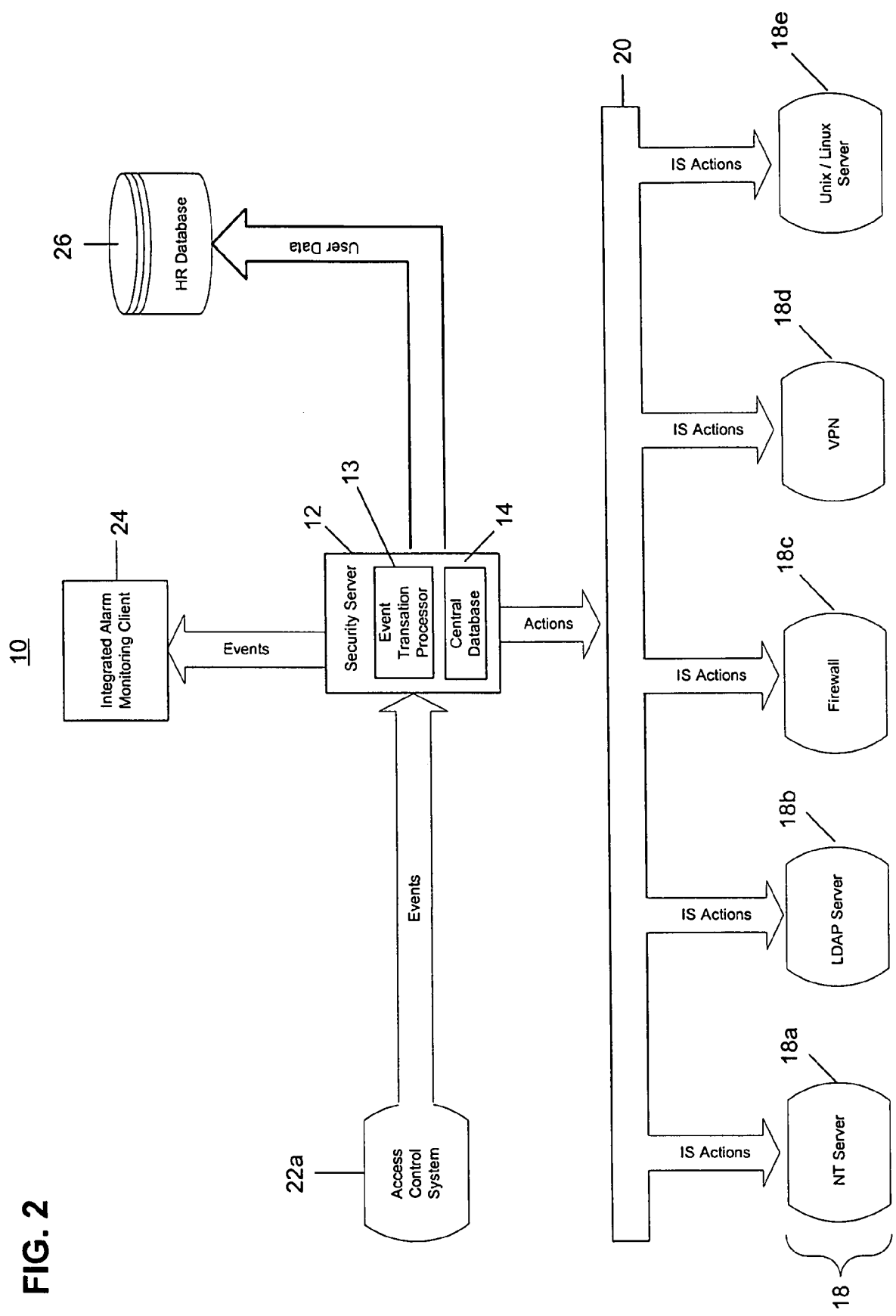
FIG. 2 is a block diagram of the system of FIG. 1 showing the processing of an event from a facility protection system, the access control system, to cause actions at information systems.
Figure 3:
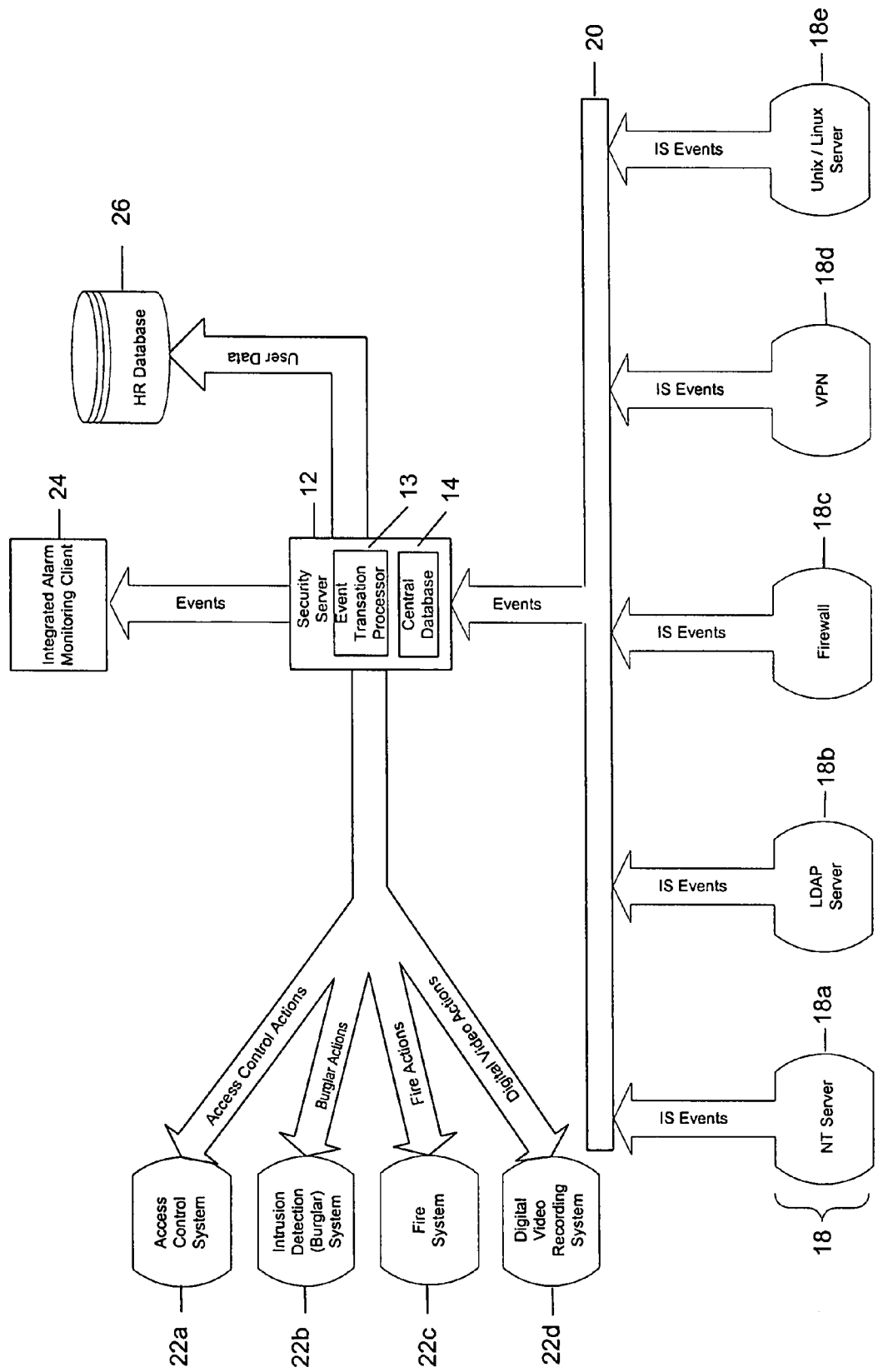
FIG. 3 is a block diagram of the system of FIG. 1 showing the processing of an event from an information system to cause actions at the access control system.
Figure 5A:
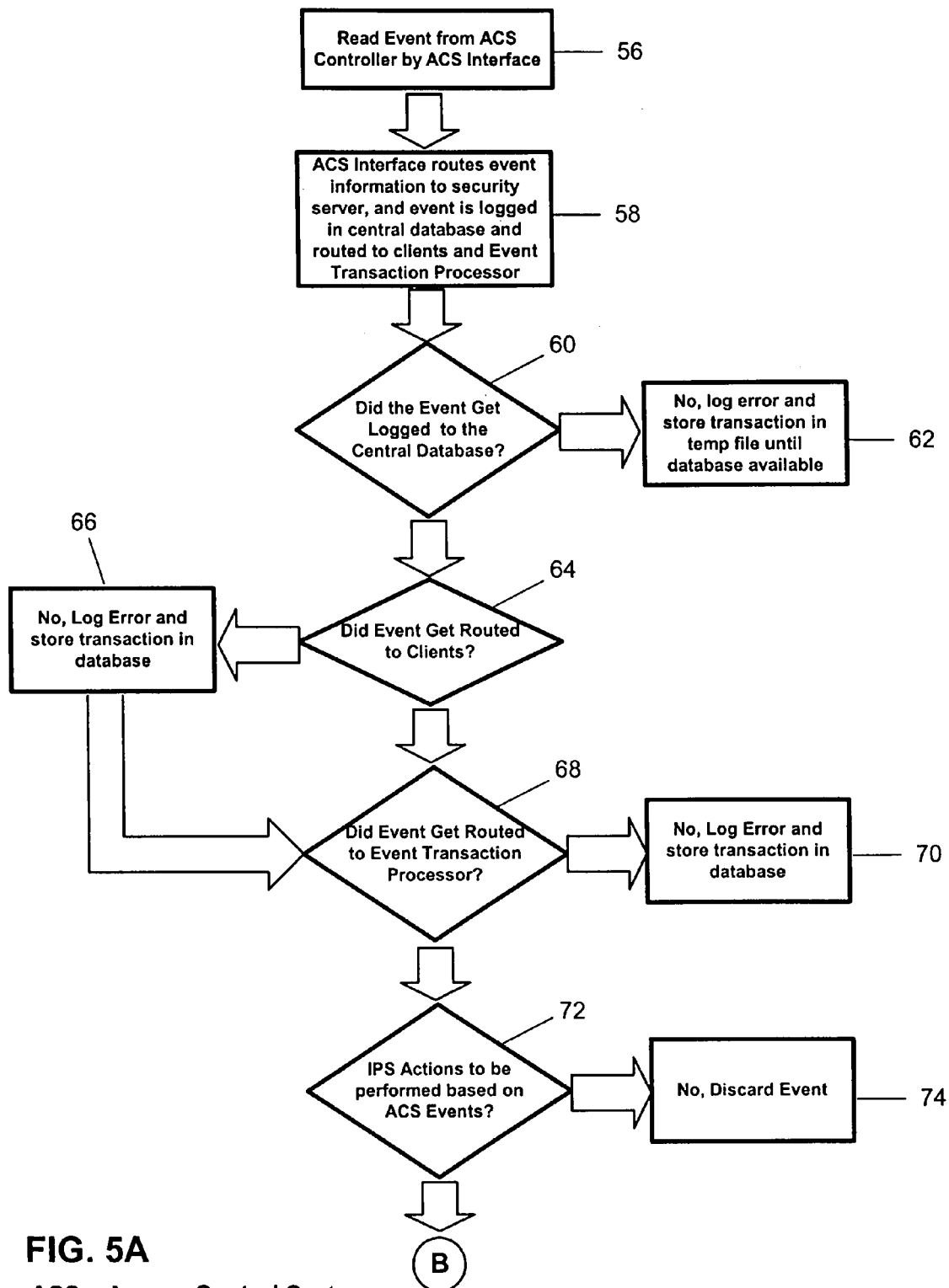
FIGS. 5A and 5B are connected flow charts showing the process in the system of FIG. 1 when an event occurs at the access control system.
Figure 5B:
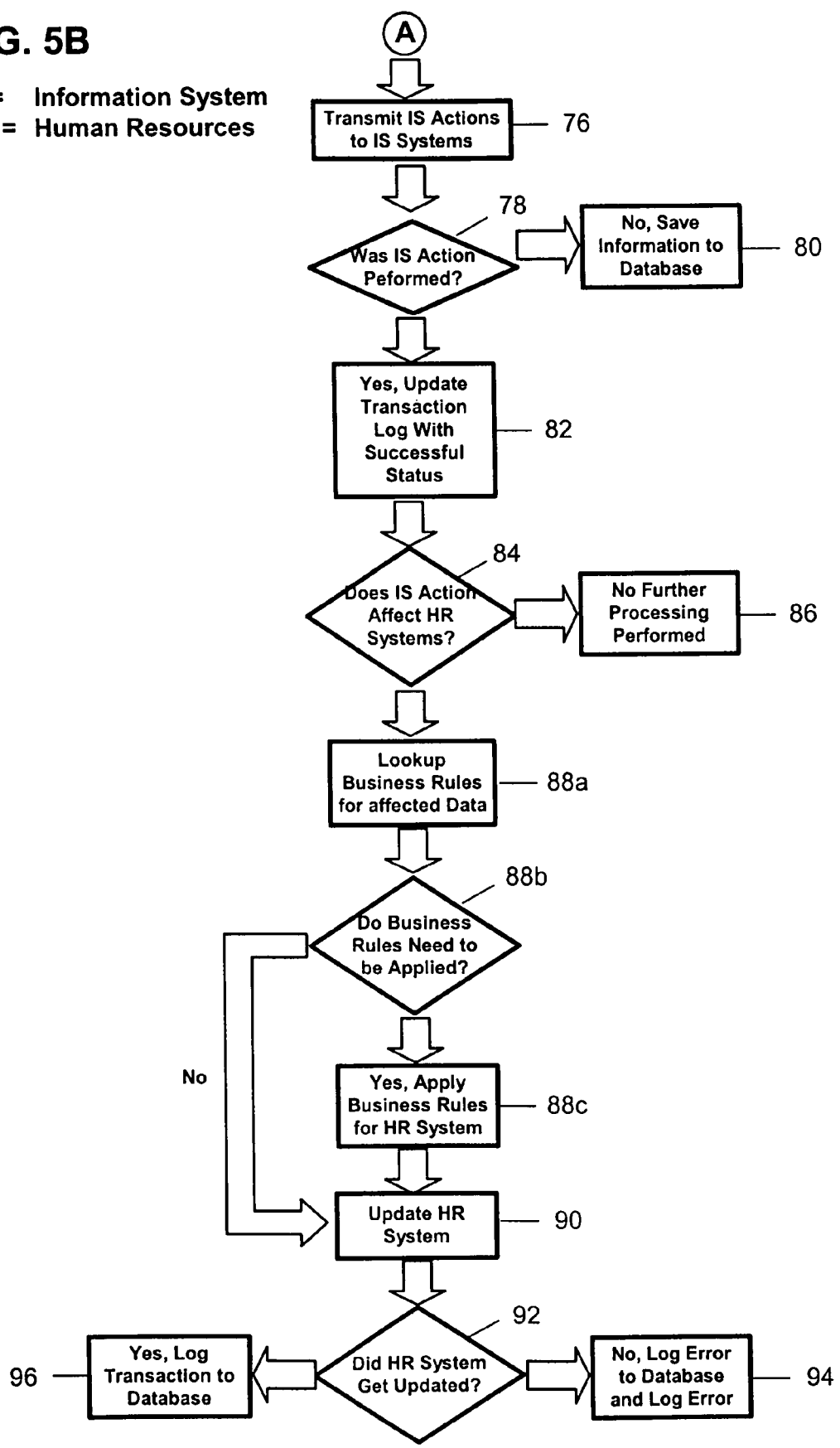
Figure 6A:
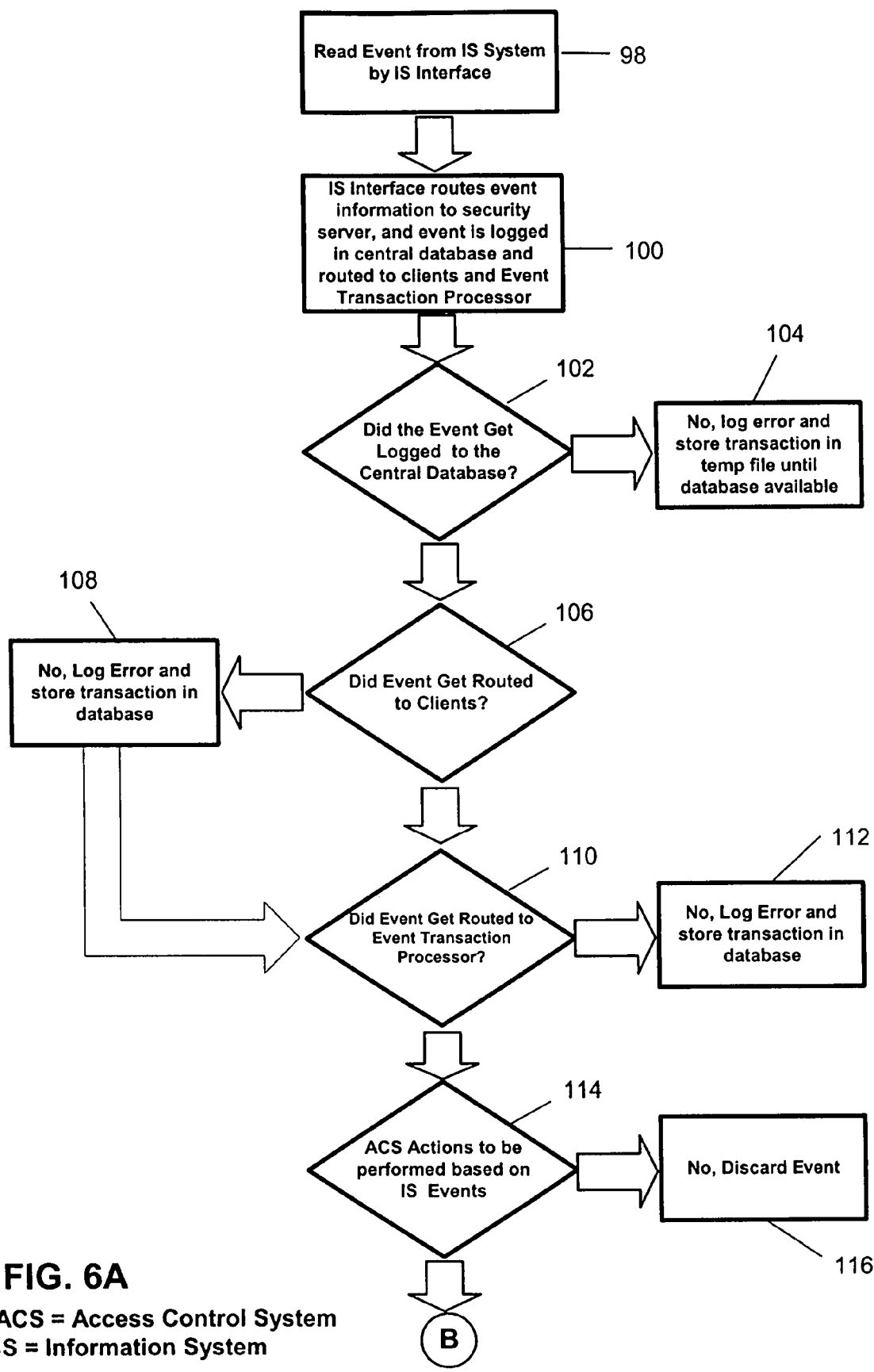
FIGS. 6A, 6B and 6C are connected flow charts showing the process in the system of FIG. 1 when an event occurs at an information system.
Figure 6B:
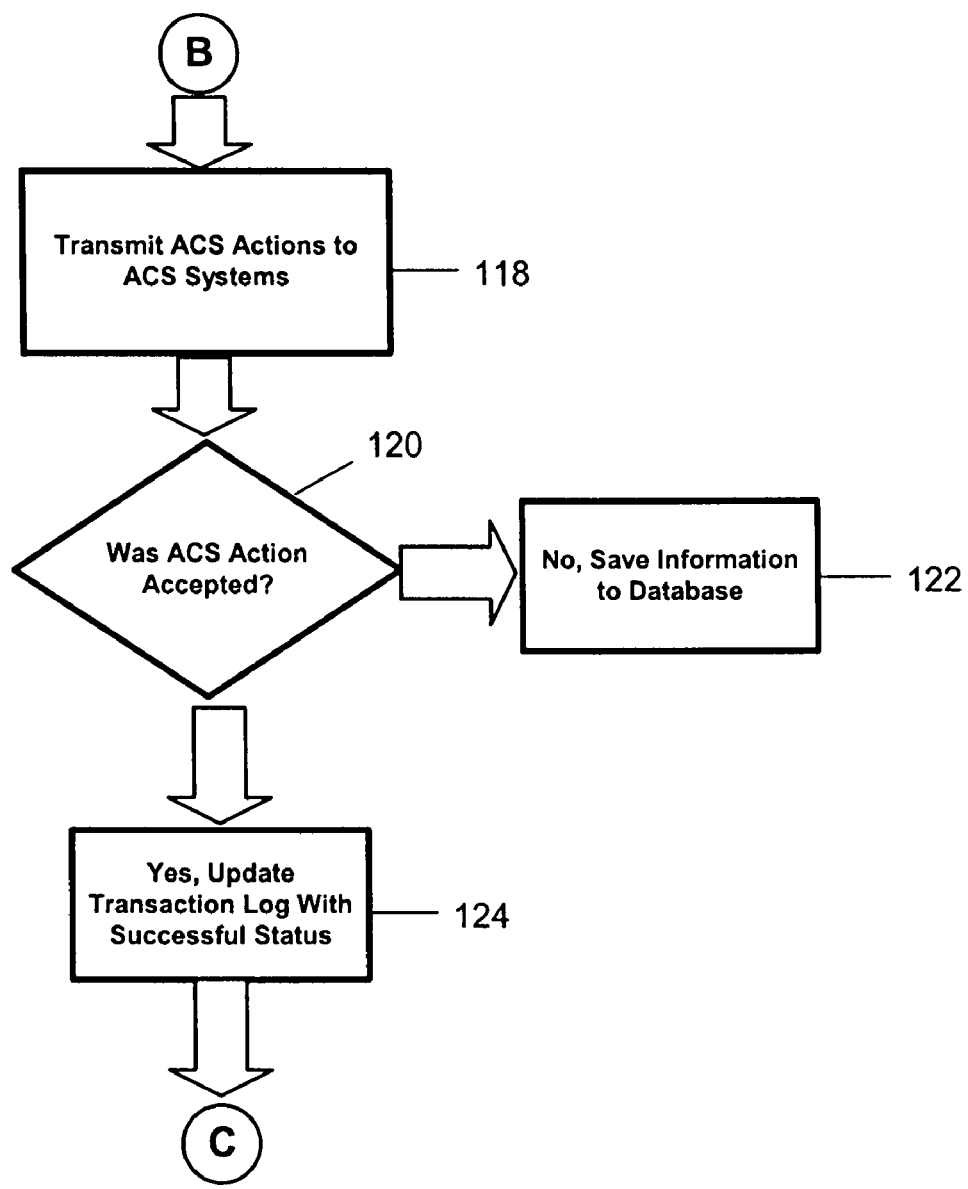
Figure 6C:
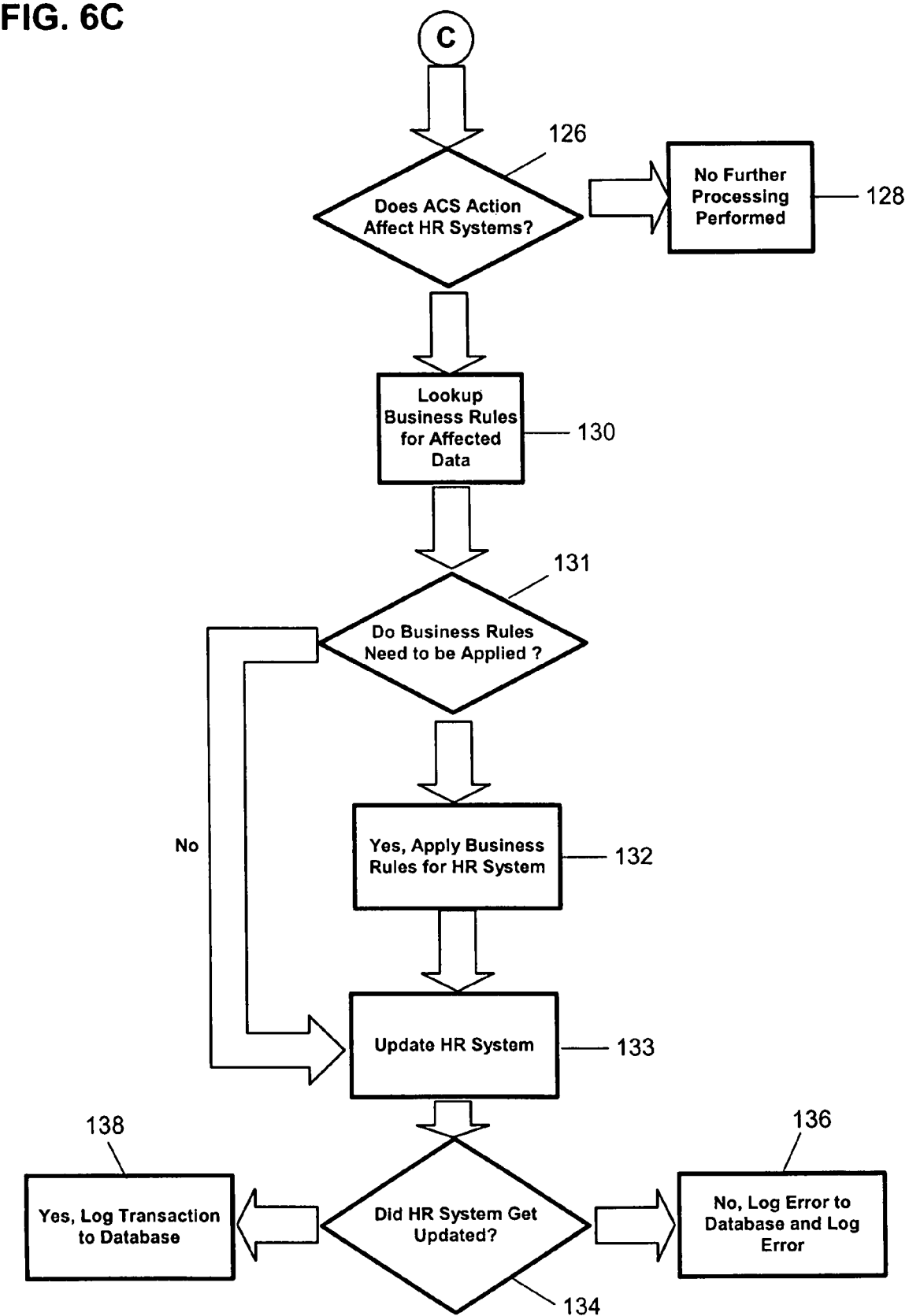

The security server 12 receives each of the event data packets at an event transaction processor 13 for determination of actions, if any, the system 10 will take, and, depending on the event received, sending action data packets automatically and in real-time to systems 18 and 22 to take appropriate action. Actions may be based on occurrence of a single event or multiple events at the same or different ones of systems 18 and 22. The event data packets may further be sent to one or more monitoring client systems 24 for monitoring of events. Action data packets may also be sent to monitoring client systems 24 for monitoring system 10's response to actions. An illustration of the process in system 10 for an event data packet transmitted from the access control system 22a to security server 12 is shown in FIG. 2, in which action data packets may be sent to each of the information systems 18 to cause actions to take place in such systems to protect information property, as shown in FIGS. 5A and 5B. The process in system 10 for an event data packet transmitted from any one of information systems 18 to security server 12 is shown in FIG. 3, in which as a result, action data packets may be sent to facility protection systems 22 to cause actions to take place on such systems to protect physical property by limiting or locking out a users to areas of a building, as shown in FIGS. 6A-6C with respect to the access control system 22a. Another action which may be taken by security server 12 is to call a preset pager number, a telephone number with an automated message, or e-mail address with a message in response to specific event types via output devices 16.

In addition to events being received by the security server from facility protection systems 22 and information systems 18, events may automatically be generated by the security server, such as based on a predefined termination date of a user's access privileges, which when read by the event transaction processor 13 causes actions to limit or remove access privileges by the user to facilities controlled by the access control system 18a and information systems 18.

The information from the event data packets is also stored by the security server 12 chronologically as a record in an event log in the central database 14. An event log record includes at least the time and date, originator (i.e., System ID) of the event data packet, and data content describing the event. Unique codes may be used by security server 12 for different events from systems 18 or 22. As stated earlier, each event data packet is also sent by security server 12 to one or more alarm monitoring client systems 24 which enable real-time display of events to personnel, especially such events representing alarms. The security server 12 maintains in the central database a list of the IP addresses of such client systems 24 to which event data packets are routed. Alarm monitoring client systems 24 represent computer workstations, computer systems, or other devices capable of receiving event data, which can connect to security server 12 over the network, or receive messages by e-mail, pager, or personal digital assistant, from security server 12, via output devices 16. Software applications operating on such alarm-monitoring client system to enable display of events occurring in system 10 may be such, as used in the ONGUARD® system mentioned earlier.

The system 10 also includes an external database, shown as a Human Resource (HR) database 26 (or a directory, accessible through protocols such as LDAP), as described in the above-incorporated patent application, in which transactions in user data are sent to the security server 12 for storage in one or more tables of the central database 14. The HR database 26 may be memory of another computer server to enable communication with security server 12. HR database 26 is coupled to HR computer systems 28. Each time user information stored in HR database 26 is changed (add, modify, or delete) by HR computer systems 28, a transaction defining the change is stored on the HR database. The transaction can be read by security server 12 and downloaded by the server to map the changed user data from the HR database 26 to records in one or more user data tables of the central database 12, similar to that described in the earlier incorporated patent application. Examples of tables for integration of the access control system 22a of this incorporated application with other facility protection systems 22, and information systems 18, are described later below.

In response to receiving user data representing additions of a new user to system 10, security server 12 assigns a unique Internal ID for internal management of users, and assigns security information, such security access privileges, in system 10 in facility protection system's physical environment of ACS 22a, IDS 22b, and to information systems 18 data and network environment. For example, user data stored in the central database may include information regarding the type of user (or employee type) as researcher, sales, contractor, or any other type that may characterize particular access privileges to areas of a building and type of information. An access privileges lookup table in memory of the central database 14 associates user data, such as type of user and/or time periods/shifts, to one of different access privileges in the access control system 22a. Each access privilege characterizes the areas and time of access to controlled areas of buildings. Such tables are described in the incorporated patent application as Access Level Link Table and Access Lenel Table. Similarly, the same access privileges look-up table, or a different look-up table, specifies which zones, if any, of the IDS 22b the user can mask. The same access privilege look-up table, or a different look-up table in memory of the central database 14 associates user data, such as type of user, department, or location (building, city or state) to one or more of the information systems 18 the user should have access to. The access privileges in facility protection systems (22a and 22b) and information systems 18 may change in accordance with updated user data received in transactions for the HR database 26.

As shown in FIGS. 2 and 3, if such action in response to an event changes user data stored on security server 12, in central database 14 such change in user data may be sent to the HR database 26, such that the HR database is maintained current. Further, an administration system 30 in FIG. 1, representing a computer system, is provided in system 10 which can access the central database 14 in security server 12 to review and update information stored therein, such as update user data, security access privileges, or generate and manage badge ID cards, or action ID Credentials, and also Login IDs, passwords, and other digital credentials, such as smart cards, security tokens, digital certificates and biometric templates.

The central database 12 includes multiple tables for data management of system 10. One such table is the User Table, as shown for example below.

USER TABLE

Internal ID
LastName
FirstName
MiddleName
SSN
Last Changed
Address
City
State
Zipcode
Department
Phone
Building
Title
User Type
Status
Termination Date Each user has a record in the User Table, referred to herein as a user record, which in the example shown above includes the following data fields: a unique Internal ID, assigned by system 10 for identifying each user; LastName, FirstName, and MiddleName for the parts of the user's name; SSN is the user's social security number or other public unique identifier for an individual; Last Changed is the date and time the record was last changed; Address, City, State, and Zipcode, of the user's work address; Department is the department or group the user is associated with; Phone is the user's work phone number; Building is the building where the user works; Title is the title of the user's position; user Type refers to the type of user as described earlier; Status may be active, non-active, or one of different types of non-active, such as medical or retired; and Termination Date, if applicable, may be used for term employees, such as contractors or seasonal workers. Other information stored in the fields of the user table, may be such as described in the Employee table of U.S. patent application Ser. No. 09/135,822, filed Aug. 18, 1998, or as needed based on the institution in which system 10 is used.

Another table in the central database 12 is the User-System-Security Table shown, for example, below.

USER-SYSTEM-SECURITY TABLE

System ID
Internal ID
Login ID
Password
SID
Status

The records in the User-System-Security Table stores for each user their access privileges to information systems 18 in terms of which information system the user has access to. In other words, for each information system 18 the user has access to, a record exists in this table having the System ID of the information system, the Internal ID of the user in system 10, and authorization information, Login ID and Password, for the user to access their account on the information system. Also stored in the table is a SID which represent a security identifier having a value unique to every account for a user in a given system, which reference the users for that system and their associated authorization information, i.e., Login ID and Password. For example, Domain Controllers for Windows NT Server 18*a*, assigns a unique SID for each user having an account on the system, and stores on its server 18 (such as a database), records linking the SID to the Login ID and Password, assigned to the user. Optionally, to avoid duplicating data for such an information system 18 using SID's, the Login ID and Password fields in a record of the User-System-Security Table of that system may be removed. In this case, if the Login ID and/or password of a user were needed by the security server 12, the server by a querying command in an action data packet to the information system may obtain the Login ID and/or password for a SID. If an information system 18 does not use an SID, then that field in the User-System-Security Table need not be used. The User Table and the User-System-Security Table are relationally linked by the Internal ID of the user.

When a new user is added in system 10, such as by the addition of user record in the User Table, the security server 12 automatically determines which of the information system 18 the user should have access to based on the lookup table described earlier which associates user data of the user record with one, several, or all of the information system 18, i.e., System ID of those information system(s) such a user should have access to. This is useful in assuring that only users needing access to an information system are provided with such access. For example, in a work environment where users are employees, an employee in the Sales Department, would not need access to an information system used by employees in a Research and Development (R&D) Department, and an employee in an R&D Department would not need access to an information system storing sales information. Alternatively, users may have access to all information systems 18 in system 10, and thus no use of a look-up table to assign access privileges to information system is needed. Although a look-up table is described, any rules may be programmed to associate information in one or more fields on User Table and particular information systems 18.

Once the information systems 18 are identified for the new user, the security server 12 adds a record to the User-System-Security Table for each of such information system having the Internal ID of the user and the System ID of the information system. The security server 12 for each new record in this table, automatically determines the Login ID and Password in accordance with the authorization protocol of the information system associated with the record, stores the Login ID and Password in the record, and sends a new account command in an action data packet over the network 20 to the information system to open a new user account with that Login ID and password. For example, such Login ID and/or password may be based on combination of a user's first and last name from the user record in the User Table data. The new account command would also include any other information needed by the particular information system for opening an account, such as name of user, department, and type of employee, location, or other information in the user record in the User Table. Usually, the new account when opened is assigned default privileges by the information system 18 to its resources, such as directories, files, documents, databases, programs, or network(s) maintained by such information system. Optionally, an information system 18 may use the information about the user provided by the security server 12 to assign access privileges in terms of which resources such user may access, or time of day or specific terminals or computers access is to be made available. Such assigned privileges by the information system is stored in each respective information system and can be accessed and modified by the security server 12 via a query command in an action data packet with using SIDs or Login ID. If the Login ID already exists for the information system when a new account command is received, the information system will not generate an account for the user, and will send a message to the security server informing that the Login ID is in use. In such a case, the security server 12 automatically, based on the rules for that information system, generates a new Login ID, such as for example, replacing or adding more letters or numbers to the previously determined Login ID. The new Login ID is then stored in the record in the record for the information system and user in the User-System-Security Table, and a new account command is resent in an action data packet to the information system to open a new user account with the password and new Login ID. Alternatively, the security server 12 could defer to an information system 18 to provide the user authorization information, in which the new account command in an action data packet would have information about the user from the user record, and the information system would return to the security server the user authorization information (SID, or Login ID and Password) for storage in a record in the User-System-Security Table.

In response to opening a new account, the information system 18 returns an SID and the security server 12 stores the SID in the record for the information system (System ID) and user (Internal ID) in the User-System-Security Table. The return of an SID thus represents a confirmation message that the new account is successfully opened. If the information system does not use SID's, a confirmation message is also returned to the security server 12 indicating the new account is successfully opened having the Login ID of the user. The above is repeated for each information system the new user will have access to.

If a user record in the User Table is changed (added, deleted, or updated), and such changes may effect security access to information systems 18, especially if the user record is deleted, or fields of the user record associated with access privileges, such as status or employee type, have changed. Changes in user records effecting security access are downloaded (distributed) to information systems. For example, if a user record were deleted, then all records for the user in the User-System-Security Table will be deleted or have their Status fields changed to inactive, and the security server automatically sends a disable Login (or account) command in an action data packet to the System ID of information system of the effected records. Further, for example, if in a user record fields associated with access privileges were changed, the security server using the look-up table providing access privilege association between user table fields and information systems, adds a new record in the User-System-Security Table for each new information system to which the user has access, such as described earlier in opening a new user account, and changes the Status field to inactive for records in the User-System-Security Table for the user for any information system to which access privileges are no longer provided, such as described earlier in disabling a user's Login. Sometimes, changes in the User Table records do not effect security access, but represent information stored for the user's account in the information system, such as address or phone number, which may be downloaded to an information system in an action data packet with the SID or Login ID of the user and an account update command with the updated information.

Further, another table, Security-System-Table may be provide, such as shown for example below.

SYSTEM SECURITY TABLE

---
System ID
System Name
Server Location
Locations
---

For each information system 18 in system 10, the System Security Table has a record including fields: System ID of the information system; System Name of the information system of that System ID; Server Location having as text or codes defining the particular facility where the information system's server is located; and Locations having text or codes defining the site, building, rooms, or areas of a facility where use of the information system is authorized, such as where terminals or computers associated with the information system are located. This is useful for associating the physical environment protected by facility protections systems with each information system.

The user's authorization information for the information systems 18 typically has user authorization information of a Login ID and Password, needed to enable to the user to access the user's account on the system, such as described above. If other or additional digital ID Credentials are needed for a particular information system, such may be stored in additional field(s) in the record for the user to the information system in the User-System-Security Table, or such fields may store the location, address, or filename, where such ID Credentials may be found in memory (e.g., central database) of the security server, and stored therein by a central system administration client 30. Such a client 30 would have components or other means for obtaining such ID Credentials information, such as digital certificates, fingerprint data, or other biometric information.

An information system 18 when first added to the system 10 and linked to the security server 12 may have user accounts already established. If a user already has an account for a particular information system 18 when that information system is first added to system 10, then the SID for the user is mapped to the user's Internal ID for storage in a record the User-System-Security Table of the central database 14 having the System ID of the information system. Similarly, other digital ID Credentials may be mapped, such as Login ID and Passwords.

Additional tables in the central database 14 store the users' badges or other user authenticity ID credential to gain entry/exit to areas of facilities controlled by the access control system 22a. These table(s), including a Badge Table, is described in the earlier incorporated patent application.

Other tables may also be provided in the central database 14, depending on the facility protection systems 22 in system 10. For example, each user having a personal safety device has a record in a Transmitter Table including their Internal ID, and frequency, code, and/or identifier of their personal transmitter. For example, each of the assets being managed has a record in an Asset Table including their unique Asset ID, and information describing the asset. Each user possessing a managed asset would have a record in an Asset Link Table, which includes the Internal ID of the user, and the Asset ID(s) of an Asset Group the user may possess. The Asset Group refers to a list of Assets, i.e., Asset IDs, which may be grouped together.

The intrusion detection system 22b may store a list of Internal IDs of users as codes enabling masking of zone at its control panels. The access privileges look-up table in the central database 14 described earlier can include information as to whether a user has masking access privilege and the extent of the zones to which the privilege in system 22b extends. At the same time, access to information systems 18 is being established, security server 12 may automatically download new or changed security information to the access controllers of the access control system 22a in accordance with the security privileges of the user, such that a badge, or other personal credentials, such as a biometric template, may be used by the user to enter certain areas of the building at certain times, as described in the earlier incorporated patent application. Further, the security server 12 may automatically download new or changed security information to the intrusion detection system 22b any zones the user will have the ability to mask from detection from the system in accordance with the security privileges of the user. The security server 12 can further download to information systems 18 new or changes in security data for each user based on information stored relevant to such security in the central database, as described earlier. Thus, system 10 enables central control of access privileges to all systems 18 and 22. The distribution (download) of security information in system 10 is described in more detail below.

Figure 4A:
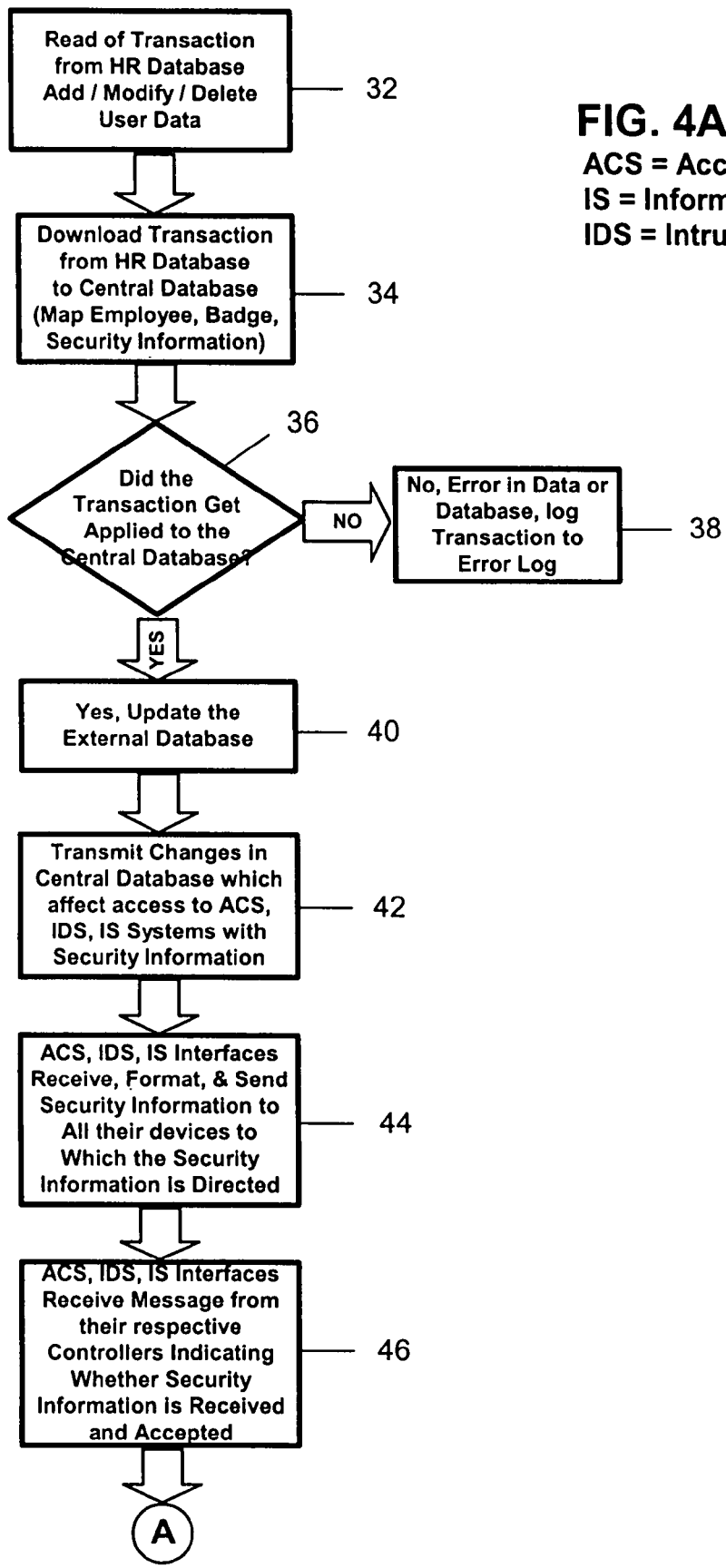
FIGS. 4A and 4B are connected flow charts showing the process in the system of FIG. 1 for downloading security information to the central database and distribution of security information to access control system, intrusion detection system, and information systems.
Figure 4B:
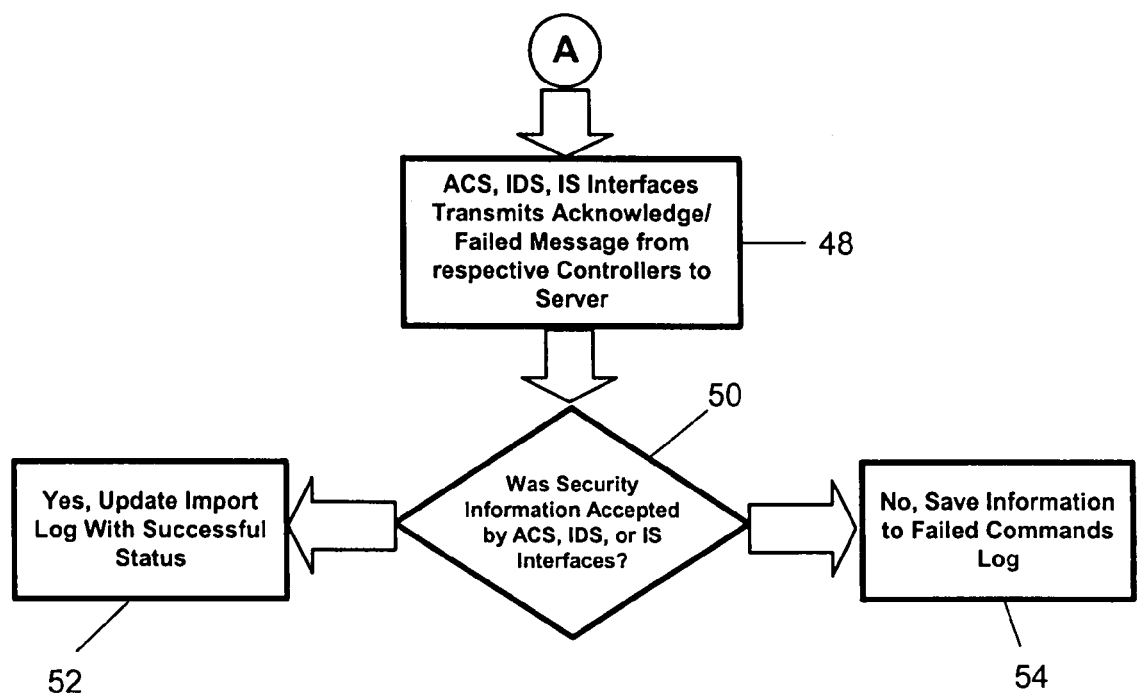

Referring to FIGS. 4A and 4B, a flow chart for the distribution of security information in system 10 in response to transactions read from a transaction table in the HR database 26 is shown. In these figures and FIGS. 5A,5B, and 6A-6C, IPS or IS refers to one of information systems 18. The security server 12 first reads a transaction from the list queued in the transaction table specifying the update (add, modify, or delete) in the user data maintained in the HR database (step 32), and maps the updated user data into records of one or more of the tables of the central database 14 (step 34). The user data provides information about a user such as stored in the User Table. The download and mapping of user data from the HR database 26 to the central database 14 of steps 32 and 34 may be similar to that described in detail in the earlier incorporated patent application. Such mapping includes assigning the security information, security access privileges for access control system 22a and to information systems 18 by building or updating records in the User-System-Security-Table for information system the user should have access to if either a new user is added, or the user data is modified such that the security information for the user is affected. For example, changing the user type may change their access privileges. The security server 12 checks if the transaction read was mapped to the central database (step 36). If so, the HR database is updated by removing the transaction from its transaction table (step 40), otherwise, an error in either the central database, or in the user data of the transaction, has occurred, and a copy of the transaction is stored in an error log of the central database 14 for review by administrator system 30 (step 38).

Next, at step 42, changes in a user's security information stored in the central database affecting access privileges are transmitted to the access control system 22a, intrusion detection system 22b, and information systems 18. To send changes in security information for a user, an action data packet is sent to each affected system to effect the user's account on the information system. The action data packet sent to network and information system 18 uses a command appropriate for the interface of system 18 with the Login ID or SID in accordance with the user's Internal ID in the User-System-Security Table. If no Login ID is present on the information system 18, one is generated as described earlier with a default password. The action data packet transmitted to the access control system 22a uses a command appropriate for the interface of the access control system with the Internal ID of the user. The transmission of the information in the action data packet for the access control system to add, modify, or delete security information, may be similar to that described in the earlier incorporated patent application.

The interface for each information system 18, access control system 22a, and intrusion detection system 22b receives, formats, and sends the security information to controllers of such systems to update the security information for the system accordingly (step 44). In the case of information system 18, such command may for example, direct the system to add a new user account, delete a user account, remove access privilege or block Login, for the Login ID or SID of the user. As stated earlier, if a new user is being added, the command may be to add new user account, which include a security server generated Login ID and password, or the information system will return to the security server 12, SID or the Login ID and password assigned for that system, for association with the User-System-Security Table. In the case of the access control system 22a, the action data packet may be addressed by the security server 12 to the access controller(s) affected having a command for the Internal ID of the user. Further, for the intrusion detection system 22b, the controllers (control panels) of the system may be updated with respect to the Internal ID to mask zones monitored by the system. The particular command and content of fields of the data structure of the action data packet depends on the security information change for the user in the central database 14. The interface of the access control system 22a, intrusion detection system 22b, and information system 18 receive messages from the respective controllers indicating whether the security information was received and accepted (step 46), and transmits a response message from their respective controllers to the security server 12 indicating such (step 48). For each access control system 22a, intrusion detection system 22b, and network and information system 18, if the security server 12 receives a message indicating that the security information was accepted by the interface (step 50), the server 12 stores in an import log of the central database 14 an entry indicating that the download of security information was successful (step 52). If the security information was not accepted, the security server 12 stores in a failed commands log of the central database 14 a copy of the information of the action data packet sent to the system for review by personnel at administration system 30 (step 54).

Referring to FIGS. 5A and 5B, the process of an event occurring at the access control system 22a is shown. For example, events may be a badge used at a card reader to access an area, or a "forced door open" to access an area. Starting at step 56, the event is first read (collected) by the software interface from memory of the access controller of system 22a. The software interface sends (routes) the event information in an event data packet to the security server 12, which logs the event data packet as an event transaction in the central database 14, and routes the event transaction to alarm monitoring clients 24 and event transaction processor 13 (step 50). If the event transaction did not get logged in the central database 14 (step 60), an error has occurred, and a copy of the event transaction is stored in a temporary file in the central database, until the central database 14 is available to log the event transaction (step 62). If the event transaction did not get routed to alarm monitoring clients (step 64), an error is stored in the error log of the central database 14 with a copy of the event transaction (step 66). Each client returns a message to the security server 12 indicating the event transaction was received. The security server 12 determines that an event transaction was not routed to a client when no such message is returned from a client. If the event transaction did not get routed to the event transaction processor 13 (step 68), an error is stored in the error log of the central database 14 with a copy of the event transaction (step 70). The security server 12 knows when an event was routed to the event transaction processor when it received an ACK (acknowledge) message from the processor. The event transaction processor 13 determines if any actions are needed at the information systems 18 in response to the event transaction from the access control system 22a (step 72). If so, the event transaction processor formats action data packets to direct information systems 18 to take appropriate actions (step 76), otherwise the event transaction is discarded by the event transaction processor (step 74). The operation of the event transaction processor at steps 72, 74 and 76 are described in more detail in connection with FIG. 7. Each of the interfaces of the information systems 18 receiving an action data packet, directs the controller of the information system 18 to operate in accordance with the command and data of the action data packet, and sends a message back to the security server 12 indicating whether the action data packet was accepted. The security server 12 checks the received message for each information system interface to determine if the action data packet was accepted (step 78). If so, the security server 12 updates a transaction log in the central database 14 with a success status (step 82), otherwise, a copy of the sent action data packet is stored in the central database 14 for review by personnel at administrator system 30 (step 80). Similarly, an event from any facility protection system 22 may be processed in the same manner as described from access control system 22a, and cause actions at other facility protection systems and/or information systems.

The actions taken by the information systems 18 to protect networks and data resources sometimes needs to be made aware to HR personnel, such that they are aware of any changes in the status of the users and access privileges in the information system 18, or if needed, take appropriate corrective action. For example, a badge used by a user to access areas controlled by the access control system may have expired, causing an event transaction which sends action data packets to information systems 18 to block the user's Login ID. The security server 12 can check a list of such actions requiring HR notification stored in central database 14 to determine if the action affects HR (step 84). If so, the business rules for the affected data are looked up, such as in a table of the central database 14 (step 88a) and then the security server 12 check if it needs to be applied (step 88b). Business rules represent when the action taken requires that data stored in the HR system's database be changed. If no business rules are found, or if the business rules found require only that notification be provided, the no branch from step 88b is taken to step 90 to send an update transaction to the HR system to notify personnel in HR, such as in a log. If the business rules need to be applied at step 88b, the business rules are applied for the HR system to send an update transaction that both provides notification and updates the appropriate record in the HR database for the user affected at step 90. The HR database 26 sends a message to the security server 12 if the HR database was successfully updated. If so, the transaction is logged in the transaction log of the central database 14 (step 96), otherwise, an error is added to the error log of the central database 14 with a copy of the update transaction sent (step 94).

Referring to FIGS. 6A-6C, the process of an event occurring at one of the information systems 18 is shown. For example, an event may be a network intrusion detection such as by Windows NT Server 18a at a terminal located within a particular building. Starting at step 98, the event is first read by the software interface from memory of the information system 18 storing the event. The interface sends (routes) the event information in an event data packet to the security server 12, which logs the event data packet as an event transaction in the central database 14, and routes the event transaction to alarm monitoring clients 24 and event transaction processor 13 (step 100). If the event transaction was not logged in the central database 14 (step 102), an error has occurred, and a copy of the event transaction is stored in a temporary file in the central database, until the central database 14 is available to log the transaction (step 104). If the event transaction was not routed to any alarm monitoring clients (step 106), an error is stored in the error log of the central database 14 with a copy of the event transaction (step 108). If the event transaction did not get routed to the global event transaction processor 13 (step 110), an error is stored in the error log of the central database 14 with a copy of the event transaction (step 112). The event transaction processor 13 determines if any actions are needed at the access control system 22a (step 114). If so, the event transaction processor 13 formats action data packets to direct the access control systems 22a to take appropriate actions (step 118), otherwise the event transaction is discarded by the event transaction processor (step 122). The operation of the global event transaction processor at step 114, 116, and 118 are described later in more detail in connection with FIG. 7. The software interface of the access control system 22a receives the action data packet to direct the access controller of the access control system 22a to operate according to the command and data of the action data packet, and sends a message back to the security server 12 indicating whether the action data packet was accepted. The security server 12 checks the received message to determine if the action data packet was accepted (step 120). If so, the security server 12 updates a transaction log in the central database 14 with a success status (step 124), otherwise, a copy of the sent action data packet is stored in the central database 14 for review by administrator system 30 (step 122). If actions local to the information system are also needed in addition to sending an event to the security server 12, the information system may operate to block access for a Login ID, as typical network security systems provide when possible intrusion is detected for a Login ID. Reference at steps 114-122 to actions by access control system 22a, are exemplary, any of the facility protection systems 22 or other information systems 18 may be directed to take an action.

Internally, the security server 12 identifies each user by their Internal ID. When sending action data packets to network and information system 18, the security server 12 used the Login ID or SID associated with the Internal ID in the User-System-Security Table. The access control system 22a may use the Badge ID rather than the Internal ID to identify different badges, which may be provided in another table linked to the User Table by the Internal ID. If so, when sending action data packets to access control system 22a, the security server 12 uses the User Table to associate the Internal ID with the Badge ID assigned to the user to identify the user to the access control system.

Referring to FIG. 6C, as with actions taken by the information systems 18 to protect network and data resources, actions affecting users access to areas of building sometimes need to be made aware to HR personnel, such that appropriate corrective action may be taken. To determine whether the access control system action affects the HR system, the security server 12 checks a list of such actions requiring HR notification stored in central database 14 to determine whether the user data stored in the HR database is affected (i.e., changed) by the action (step 126). If so, the business rules for the affected data are looked up, such as in a table of the central database 14 (step 130) and then the security server 12 check if it needs to be applied (step 131). If no business rules are found, or if the business rules found require only that notification be provided, the no branch from step 131 is taken to step 133 to send an update transaction to the HR system to notify personnel in HR, such as in a log. If the business rules need to be applied at step 131, the business rules are applied for the HR system to send an update transaction that both provides notification and updates the appropriate record in the HR database for the user affected at step 133. For example, an action may be to deactivate the badge of a user at the access control system 22a. In this case, a record for the HR system for the user would then be updated indicating the badge was deactivated. In this manner, the HR records will be maintained current for users. The HR database 26 sends a message to the security server 12 if the HR database was successfully updated (step 134). If so, the transaction is logged in the transaction log of the central database 14 (step 138), otherwise, an error is added to the error log of the central database 14 with a copy of the update transaction sent (step 136).

Figure 7:
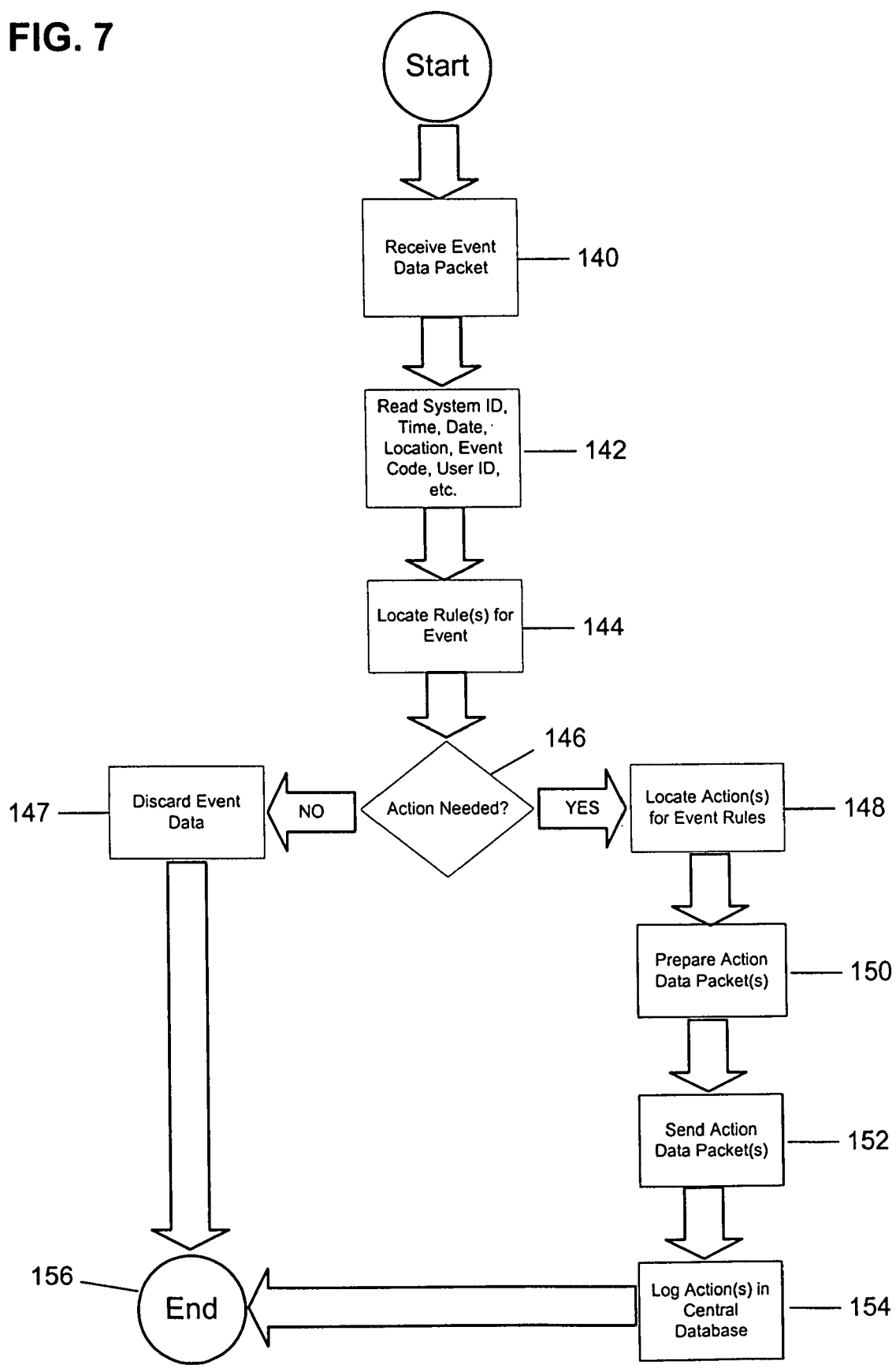
FIG. 7 is flow chart showing the operation of the event transaction processor in the security server of the system of FIG. 1.

Referring to FIG. 7, a flow chart showing the process and programming of the event transaction processor 13 of security server 12 is shown. At step 140, an event data packet is received from one of the information systems 18 and facility protection systems 22 having information for an event transaction in system 10. The originator's System ID, time and date of the event, location of the event, and an event code, (Internal ID and/or a Login ID or SID), if the event relates to a particular user, is read from the event transaction. The date and time of the event may be in data fields of a received event data packet, or the date and time the event data packet was received by the security server 12, in accordance with the time and date of the clock of security server 12. Based on the event code and originator of the event, security server 12 searches for a matching entry in a record of a Rules Table matching the event code and originator's System ID. Each entry has data with any actions to be taken by system 10. If no record is found, or no actions are indicated, the event transaction is discarded (step 147) and the process ends (step 156). If one or more actions are found for that entry, the security server 12 locates such actions (step 148) in the Rules Table and for each recipient of the action, an action data packet is prepared (steps 150). The Rules Table may include the command and data structure for fields needed for the particular software interface of the recipient of the action data packet. The action data packets are then sent to the recipient systems (step 152) and logged in central database 14 (step 154), and the process ends at step 156. The data structure for locating and applying rules of the Rules Table is exemplary. Other data structures may be used to check if a rule for an event transaction exists and the actions needed in system 10. For example, a structure of if-then conditions may be used based on the sender System ID, the system type (22a to 22d or 18a-18d) of the sender System ID, an event code for the transaction which occurred, and the target System ID(s) to be affected in response to the event. The particular actions at systems in response to an events at another system depends on the specific event, and as such, the event transaction processor may be programmed accordingly to provide the desired response which promotes security in the overall system 10.

Examples of event and corresponding actions in system 10 follow. Access control system event: an access control system 22a deactivating a badge of a user—action: block Login ID for the user at information systems 18. Access control system event: access control system 22a detects door forced open in an area—action: disable all terminals, PCs and workstations protected by information systems 18 in area where door was forced open. Fire system event: fire/smoke in a zone—action: backup data for all information systems in area associated with a zone or switch control to alternate network servers which may be located in a facility. Information system event: network intrusion detection of unauthorized access at a terminal in an area—action: access control system 22a locks door(s) in area to block exit by intruder. Information system event: information system 18 detects unauthorized login attempt after business hours—action: create alarm in access control system 22a, activate badge usage trace in access control system 22a at every card reader in the area where the unauthorized login attempt occurred, close perimeter doors to the area, activate video camera of digital video system 22d in the area and start recording and surveillance. (The digital video camera can record events in an area where an event indicating a security risk is detected, such that undisputable evidence of the event and persons involved may be obtained.) Intrusion detection event: movement sensed in a zone of a building by intrusion detection system 22b-action: access control system 22a lock door(s) in area associated with the zone to block exit by possible intruder, and secures (disables) terminals or computer to any information systems in the building area associated with the zone. Fire event: detection of fire/smoke in zone of the buildings from a fire system 22c-action: information control systems 18 having a server location in the area associated with the zone (as stored in the security system table records) immediately backups data from its servers to another location in an area of the building or another building to minimize risk of damage. Digital video event: digital video system 22d indicates movement in a scene when no users have entered the area—access control system 22a lock door(s) in area where video is taken to block exit. Information system event: user logs into a terminal—action: capture digital video or image by digital video recording and surveillance system 22d if camera in area where terminal is located. Asset management event: physical asset detected as moved through a door, by asset management system and Asset ID of the asset is not associated with Internal ID of User's badge used at reader to open door—action: activate digital video camera in area where asset is located to record scene, and access control system 22a lock doors in area to block exit by an unauthorized person.

Thus, system 10 integrates security to the physical environment provided by the access control system, and also building protection systems, with security to network and data environment provided by information systems 18, such that actions to events occur automatically and in real-time. The zones or area used by the facility protection systems 22 are associated by the event transaction processor 13 with one or more areas controlled by computers or terminals associated with information systems 18, using the location field in the record in the security system table for the information system, such that actions taken can be specific to the area of possible security risk. These events and actions are exemplary, other events typical of information systems 18 and facility protection systems 22 may cause different actions at other information systems 18 or facility protection systems 22 depending on the nature of the event.

Although the above describes the operation of the event transaction processor 13 to a single event, the event transaction processor may check whether the occurrence of multiple events requires action(s) in system 10. This may be achieved logging each event read at step 142 in a multiple event transaction log in memory of the central database 14. Preferably, only events which have event codes and System ID which match those stored on a look-up-table in the central database of possible events which could be combined with other event(s) to require action in system 10. The event transaction processor 13 operates similar to steps 144-156, each time an event is added to the multiple event transaction log, so as to locate rule(s) for any combination of events in the multiple events transaction log to determine if action is needed, and to locate, prepare, and send action data packets to effect such actions associated with each of the applicable rules. The action(s) are logged in the central database. The check for multiple events is done by the event transaction processor 13 in parallel with a check for single event, or may be done by another one of event transaction processor 13 in the security server 12.

The system 10 may optionally enhance security by maintaining user accounts at one or more information systems 18 in a disabled Login state. When an event is received by the event transaction processor 13 from the access control system 18a that a user has entered a location, such as a facility site, area, building, a room, (e.g., by use of badge at a reader of the access control system 18a) the event transaction processor applies a rule that if the location matches one or more authorized locations for use of the information system, as stored in a record in the System Security Table, for the information system, the user's Login for the information system is enabled. Similarly, when the event transaction processor 13 receives an event that the same user has exited the location, the user's Login for the information system is again disabled. Security may be further enhanced by requiring two events to occur at the event transaction processor 13, entry into an authorized location by the access control system 22a and detection at a motion sensor of the IDS 22b in the area where the terminal or computer for the information system is located in that area. An additional third event, or instead of the IDS event, may also be used if a digital video camera of the digital video recording and surveillance system 22d were located in such area where the information system terminal was located. Thus, access in the physical environment is required for access to the network and data environment of an information system.

From the foregoing description, it will be apparent that there has been provided a system and method for integrating security and access for facilities and information systems. Variations and modifications in the herein described system and method in accordance with the invention will undoubtedly suggest themselves to those skilled in the art. Accordingly, the foregoing description should be taken as illustrative and not in a limiting sense.

The invention claimed is:

1. A security system for integrating security and access for facility protection systems and information systems in which each information system represents a computer system requiring user authorization at connected computers or terminals to access information resources or network environment protected by the information system, said security system comprising:
    a computer system coupled for communication with one or more facility protection systems and one or more information systems, in which said computer system has memory storing at least user data and access privileges of users to said one or more information systems and said one or more facility protection systems, and said access privileges are capable of being assigned or updated when the user data is added, modified, or deleted in said memory; and
    said computer system being capable of receiving event data from said one or more facility protection systems and said one or more information systems, and being operative to send action data in accordance with one or more of said received events for directing said one or more facility protection systems or said one or more information system to take one or more actions.

2. The system according to claim 1 wherein said one or more information systems are capable of being directed to take one or more actions in accordance with one or more said received events from at least one of said one or more facility protection systems.

3. The system according to claim 1 wherein at least one of said one or more facility protection systems controls user access to areas of a facility, and said access privileges for each of the users comprises at least authorization information for access to said one or more of said information systems, and information representing one of different levels of access to said areas of the facility.

4. The system according to claim 1 wherein said user data comprises information characterizing at least each of said users as being one of different types, in which said access privileges of each of the users are in accordance with said user data of the user.

5. The system according to claim 1 wherein at least one of said one or more facility protection systems controls user access to areas of a facility, and other of said facility protection systems comprise one or more of an intrusion detection system, a fire system, a building automation system, a personal safety system, or a digital video recording and surveillance system.

6. The system according to claim 1 wherein said facility protection systems comprise at least an access control system which controls user access to areas of a facility.

7. The system according to claim 6 wherein said access control system comprises one or more readers for reading ID credentials associated with each of the users to obtain information uniquely associated with each of the users, said access privileges of the users are associated with the information of each of the users, and said user data stored in memory of said computer system are not added, modified or deleted when said information is read by said one or more readers.

8. The system according to claim 7 wherein said ID credentials represent one or more of badges, smart cards, tokens, or biometric information.

9. The system according to claim 7 wherein said information for each of said ID credentials represents at least an identifier uniquely associated with the user of the ID credential.

10. A method for integrating security and access for at least one facility protection system and at least one information system comprising the steps of:
    providing a computer system coupled for communication with said facility protection system and said information system in which said computer system has memory storing at least user data and access privileges of users to said information system and said facility protection system;
    assigning or updating the access privileges in said memory when the user data is added, modified, or deleted in said memory;
    sending to said computer system one or more events from one or more of said facility protection system and said information system; and
    sending one or more actions from said computer system to one or more of said facility protection system and said information system in accordance with one or more of said events for directing said one or more of said facility protection system and said information system to take one or more actions.

11. The method according to claim 10 wherein said facility protection system represents an access control system which controls user access to areas of a facility.

12. The method according to claim 11 wherein said access control system comprises one or more readers, and said method further comprises:

reading ID credentials associated with each of the users by said one or more readers to obtain information uniquely associated with each of the users, said access privileges of the users are associated with the information of each of the users, and said user data stored in memory of said computer system are not added, modified or deleted when said information is read by said one or more readers.

13. The method according to claim 10 wherein said facility protection system represents one of a plurality of facility protection systems.

14. The method according to claim 13 wherein at least one of said plurality of facility protection systems controls user access to areas of a facility, and other of said facility protection systems comprise one or more of an intrusion detection system, a fire system, a building automation system, a personal safety system, or a digital video recording and surveillance system.

15. The method according to claim 10 wherein said information system represents a computer system requiring user authorization at connected computers or terminals to access information resources or network environment protected by the information system.

16. The method according to claim 10 wherein said information system represents one of a plurality of information systems.

* * * * *